United States Patent
Liu et al.

(10) Patent No.: US 9,852,364 B2
(45) Date of Patent: Dec. 26, 2017

(54) FACE TRACK RECOGNITION WITH MULTI-SAMPLE MULTI-VIEW WEIGHTING

(71) Applicant: HULU, LLC, Santa Monica, CA (US)

(72) Inventors: Cailiang Liu, Beijing (CN); Zhibing Wang, Beijing (CN); Chenguang Zhang, Beijing (CN); Tao Xiong, Beijing (CN)

(73) Assignee: HULU, LLC, Santa Monica, CA (US)

(*) Notice: Subject to any disclaimer, the term of this patent is extended or adjusted under 35 U.S.C. 154(b) by 126 days.

(21) Appl. No.: 14/662,889

(22) Filed: Mar. 19, 2015

(65) Prior Publication Data

US 2015/0269421 A1 Sep. 24, 2015

Related U.S. Application Data (60) Provisional application No. 61/955,635, filed on Mar. 19, 2014.

(51) Int. Cl.
*G06K 9/00* (2006.01)
*G06K 9/62* (2006.01)

(52) U.S. Cl.
CPC ......... *G06K 9/629* (2013.01); *G06K 9/00295* (2013.01)

(58) Field of Classification Search
CPC ........... G06K 9/00295; G06K 9/00288; G06K 9/00281; G06K 9/00711; G06K 9/00261; G06K 9/00744; G06K 9/00765; G06K 9/629; G06K 2009/3291; G06K 9/00221; G06K 9/00248; G06T 2207/10016; G06T 2207/30201
See application file for complete search history.

(56) References Cited

U.S. PATENT DOCUMENTS

| | | | | |
|---|---|---|---|---|
| 8,150,109 B2* | 4/2012 | Sung | .................. | G06K 9/00288 382/118 |
| 2007/0172099 A1* | 7/2007 | Park | .................... | G06K 9/00281 382/118 |
| 2010/0008547 A1* | 1/2010 | Yagnik | .............. | G06F 17/30781 382/118 |
| 2010/0172551 A1* | 7/2010 | Gilley | ................ | G06K 9/00288 382/118 |
| 2014/0140625 A1* | 5/2014 | Zhang | ................ | G06K 9/00677 382/195 |

* cited by examiner

*Primary Examiner* — Kim Vu
*Assistant Examiner* — Michael Vanchy, Jr.
(74) *Attorney, Agent, or Firm* — Fountainhead Law Group P.C.

(57) ABSTRACT

In one embodiment, a method determines known features for existing face tracks that have identity labels and builds a database using these features. The face tracks may have multiple different views of a face. Multiple features from the multiple faces may be taken to build the face models. For an unlabeled face track without identity information, the method determines its sampled features and finds labeled nearest neighbor features with respect to multiple feature spaces from the face models. For each face in the unlabeled face track, the method decomposes the face as a linear combination of its neighbors from the known features from the face models. Then, the method determines weights for the known features to weight the coefficients of the known features. Particular embodiments use a non-linear weighting function to learn the weights that provides more accurate labels.

20 Claims, 7 Drawing Sheets

FACE TRACK RECOGNITION WITH MULTI-SAMPLE MULTI-VIEW WEIGHTING

CROSS REFERENCE TO RELATED APPLICATIONS

The present disclosure claims priority to U.S. Provisional App. No. 61/955,635, entitled "FACE TRACK RECOGNITION WITH MULTI-SAMPLE MULTI-VIEW LOCAL LINEAR EMBEDDING", filed Mar. 19, 2014, the contents of which is incorporated herein by reference in its entirety.

BACKGROUND

Video delivery has provided many opportunities to enhance the viewing experience for a user. For example, companies foresee this medium as an opportunity to display advertisements to users to stimulate consumption. Generally, an advertiser may have two options. One is to understand user preferences from the user's online behavior history and display advertisements related to that user preference. Another is to associate advertisements to related video content in the videos. For example, when a product appears in the video, an advertisement may be associated with that product. Also, the same concept may be used with recognized faces of people in the videos. However, face recognition is a highly-intensive computational process and often requires user input during the recognition process. This requires a lot of time for the user due to user interfaces being confusing and also the labeling being incorrect.

SUMMARY

In one embodiment, a method determining a plurality of face tracks for detected faces in a video. A set of labels is received for a portion of the plurality of face tracks from a set of users to form a set of labeled face tracks where a label in the set of labels identifies an identity for a face track in the set of labeled face tracks. The method extracts a first set of features for an unlabeled face track in the plurality of face tracks where an identity for the unlabeled face track is not known and correlates the extracted first set of features for the unlabeled face track to a second set of features from the set of labeled face tracks. Feature weights are generated for the first set of features based on confidence scores for the second set of features using a weighting function that magnifies feature weights for the second set of features with higher confidence scores and suppresses feature weights for the second set of features with lower confidence scores in a non-linear manner. The generated feature weights are used to determine a label for the unlabeled face track by applying the generated feature weights to the second set of features.

In one embodiment, a non-transitory computer-readable storage medium contains instructions, that when executed, control a computer system to be configured for: determining a plurality of face tracks for detected faces in a video; receiving a set of labels for a portion of the plurality of face tracks from a set of users to form a set of labeled face tracks, wherein a label in the set of labels identifies an identity for a face track in the set of labeled face tracks; extracting a first set of features for an unlabeled face track in the plurality of face tracks, wherein an identity for the unlabeled face track is not known; correlating the extracted first set of features for the unlabeled face track to a second set of features from the set of labeled face tracks; generating feature weights for the first set of features based on confidence scores for the second set of features using a weighting function that magnifies feature weights for the second set of features with higher confidence scores and suppresses feature weights for the second set of features with lower confidence scores in a non-linear manner; and using the generated feature weights to determine a label for the unlabeled face track by applying the generated feature weights to the second set of features.

In one embodiment, an apparatus includes: one or more computer processors; and a non-transitory computer-readable storage medium comprising instructions, that when executed, control the one or more computer processors to be configured for: determining a plurality of face tracks for detected faces in a video; receiving a set of labels for a portion of the plurality of face tracks from a set of users to form a set of labeled face tracks, wherein a label in the set of labels identifies an identity for a face track in the set of labeled face tracks; extracting a first set of features for an unlabeled face track in the plurality of face tracks, wherein an identity for the unlabeled face track is not known; correlating the extracted first set of features for the unlabeled face track to a second set of features from the set of labeled face tracks; generating feature weights for the first set of features based on confidence scores for the second set of features using a weighting function that magnifies feature weights for the second set of features with higher confidence scores and suppresses feature weights for the second set of features with lower confidence scores in a non-linear manner; and using the generated feature weights to determine a label for the unlabeled face track by applying the generated feature weights to the second set of features.

The following detailed description and accompanying drawings provide a better understanding of the nature and advantages of particular embodiments.

DETAILED DESCRIPTION

Described herein are techniques for a face recognition system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a method for labeling face tracks for detected faces in a video. Particular embodiments may detect and group faces from a video into face tracks. Then, a user interface may be output to a user to allow that user to annotate some of the face tracks. For example, users may enter a label for the identity of a face that has been included in the face tracks. These labels may be used to build face models. Then, the face models are used to label face tracks that do not have labels. Particular embodiments determine a label for an unlabeled face track by comparing the similarity between a face in the unlabeled face track to the face models.

In one embodiment, a method determines known features, such as local binary pattern features, color features and texture features, for existing face tracks that have identity labels and builds a database using these features. The face tracks may have multimodal features, which may be multiple samples of multiple different views of a face. Also, multiple modes may be used, such as local binary pattern, color and texture methods are used to determine features. Multiple features from the multiple faces may be taken to build the face models. For an unlabeled face track without identity information, the method determines its sampled features and finds labeled nearest neighbor features with respect to multiple feature spaces from the face models. For each face in the unlabeled face track, the method decomposes the face as a linear combination of its neighbors from the known features from the face models, which determines coefficients for the known features to map them to the sampled features. Then, the method determines weights for the known features to weight the coefficients of the known features. Particular embodiments use a non-linear weighting function to learn the weights that provides more accurate labels. The identity of the face track is then voted by applying the learned weights to a combination of the known features to vote the highest weighted identity associated with some of the known features.

Figure 1:
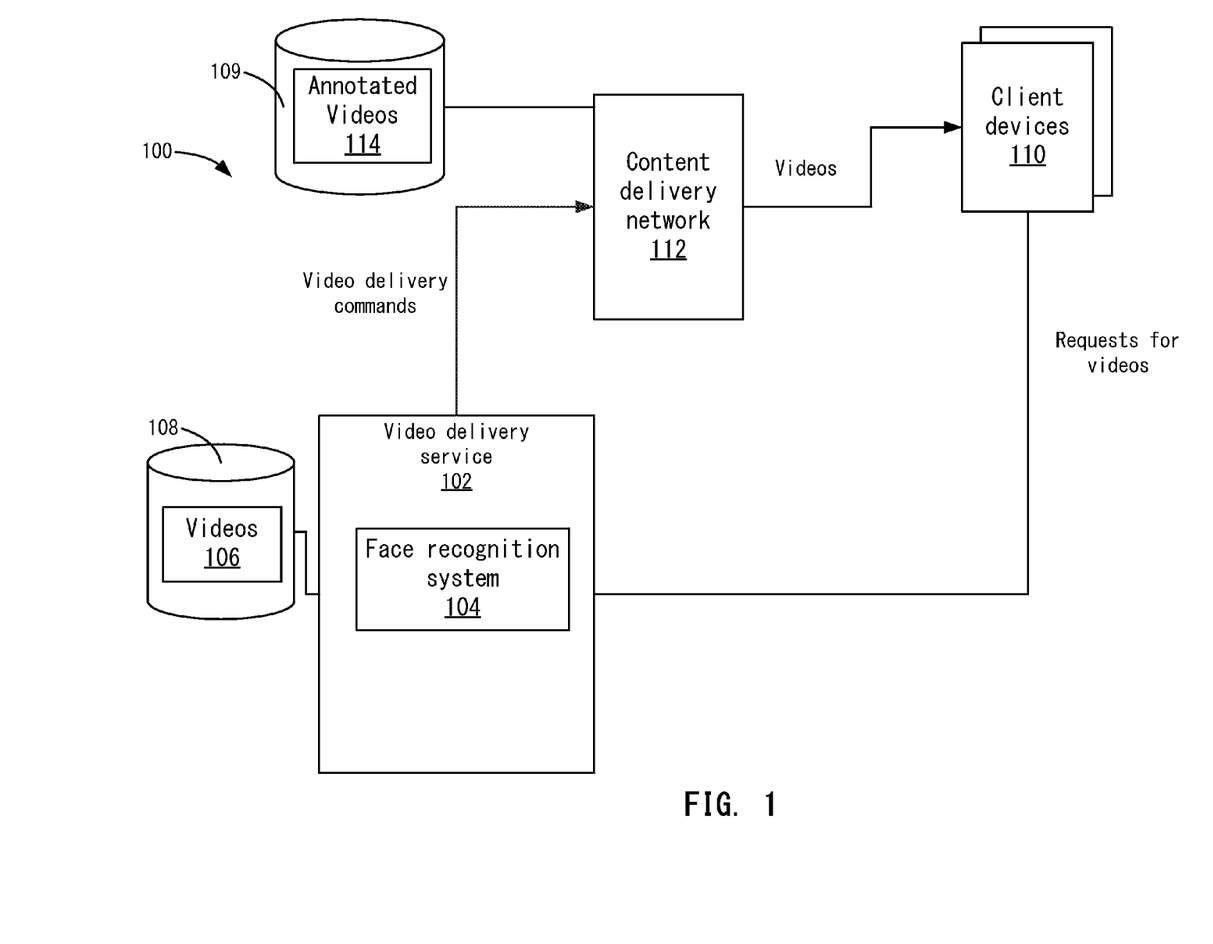
FIG. 1 depicts a system that includes a system for delivering videos and annotating the videos according to one embodiment.

FIG. 1 depicts a system 100 that includes a system for delivering videos and annotating the videos according to one embodiment. A video delivery service 102 includes a face recognition system 104 that can annotate videos 106 that are stored in storage 108 with the identities of people in the video. Providing interactive content regarding a person's identity in the video may be useful for users that want more information for a person while viewing the video on client devices 110. The annotated videos 106 are stored in storage 109 and may be delivered to client devices 110 using a content delivery network 112. In one embodiment, video delivery service 102 may receive requests from client devices 110 for videos. Video delivery service 102 may then use content delivery network 112 to deliver the annotated videos 114 to client devices 110. The videos that are delivered to client devices 110 may include interactive content that users of client devices 110 can select. For example, when an actor or object appears in the video, a user may select, such as by mousing over the face or object or using a pointer device, and be provided with more information for that actor or object. Other methods of accessing the interactive content may also be appreciated.

Figure 2:
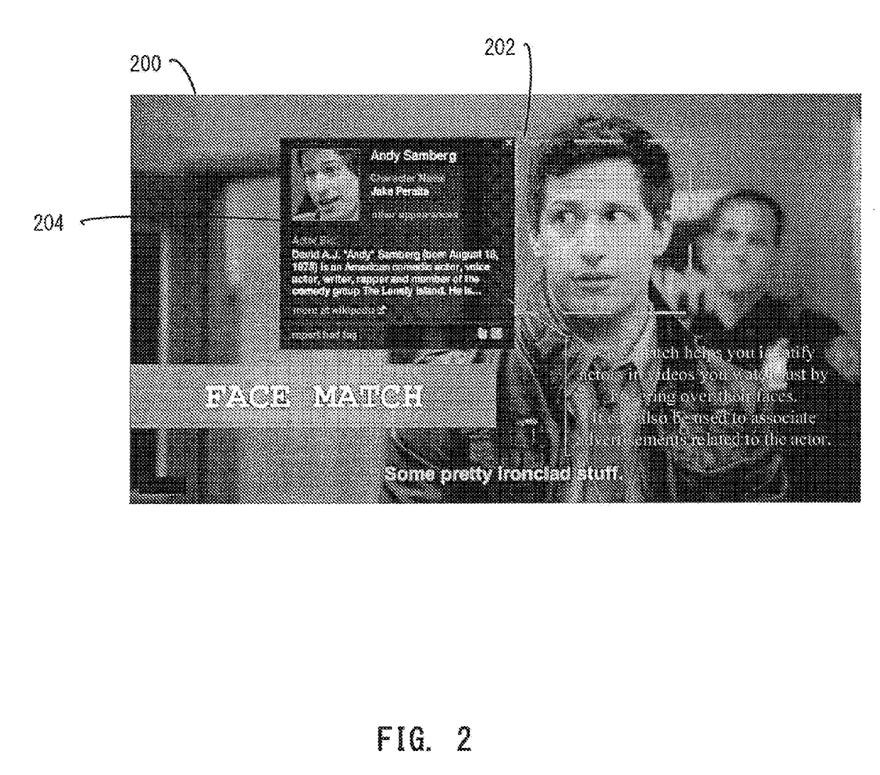
FIG. 2 depicts an example of a user interface displaying interactive content according to one embodiment.

To illustrate the interactive content, FIG. 2 depicts an example of a user interface 200 displaying interactive content according to one embodiment. In interface 200, a person has been identified in the video via a face match indicator 202 that is displayed with the user's face. A user can select indicator 202, and when selected, an information box 204 is displayed that may display more information about the person or also include an advertisement. The face match indicator may help users identify people in videos and also provide links to other information. Further, advertisements related to the person may also be provided. The information that could be displayed with the identity could include personal information or person-related advertisements when a user interacts with a media player during playback of the video.

Referring back to FIG. 1, face recognition system 104 needs to recognize the faces of a video 106 and label the faces with a correct identity of the person. Face recognition system 104 performs face track recognition to recognize an identity of a segment of temporal continuous faces in a video 106. The recognition of dynamic face images in video is different from static face recognition. The face images in video include severe occlusions, motion blur, and high variability of pose, expression, and illumination. This makes recognizing the identity of a face more challenging. Further, particular embodiments recognize a label for a face track of multiple views of a face, not a single face. Particular embodiments may group a number of face samples with different poses, expressions, and illuminations into a face track. Users are asked to label a portion of these face tracks, and these labeled portions are used to build a face model for each person. To promote diversity of features that can be recognized, more than a single video may be used. For example, particular embodiments use multiple videos for a series together to determine face tracks for labeling. This provides a more diverse feature space as more diverse face images with different motion blur or occlusion can be used. This may lead to difficulty building face models. However, using the non-linear weighting function, particular embodiments can magnify features with a higher confidence than features with a lower confidence.

Figure 3:
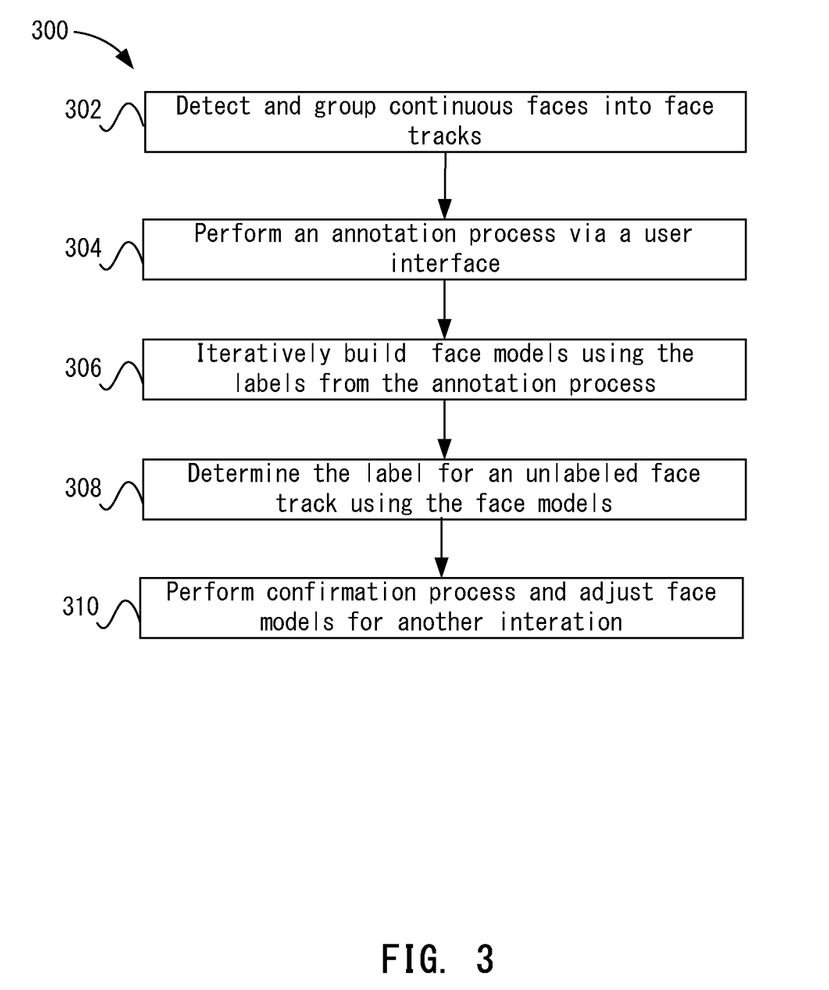
FIG. 3 depicts a simplified flowchart of a method for labeling face tracks according to one embodiment.

FIG. 3 depicts a simplified flowchart 300 of a method for labeling face tracks according to one embodiment. At 302, face recognition system 104 detects and groups continuous faces into face tracks. A face track may be a sequence of faces within boundaries, such as shot boundaries that include similar faces. Face tracking may track a detected face in a video from a start point (e.g., a position, scaling, rotation, expression, and so on,) that is detected using face detection and/or face alignment techniques. The tracking may end at a boundary, such as a shot boundary (e.g., when another camera angle is used). Face tracking is useful for several reasons. A video is generally composed of tens of thousands of frames. A face may be detected in one frame and then tracked through multiple other frames. By providing boundaries, such as shot boundaries, the concept of a face that may have similar characteristics within the shot boundary is leveraged. Since the face tracks include similar faces, identifying the face for the entire face track may be easier for a user and/or automated process. Also, this process may be faster than detecting faces in each frame and identifying each face in each frame.

At 304, face recognition system 104 performs an annotation process via a user interface according to one embodiment. In this step, a user interface may be output to a user for labeling of the face tracks. The set of users may only label a certain amount of the face tracks, such as 20%. This is less than 100% and most likely less than half of the face tracks. Requiring users to label only 20% of the faces alleviates the time required of users in the face recognition process. It will be understood that the more face tracks that are labeled by users may make the next process of face modeling more accurate.

At 306, face recognition system 104 iteratively builds face models from the features of the face tracks that were labeled from the annotation process. The face models are used to map sample features of an unidentified face track to known features of identified face tracks that have been labeled. Then, at 308, face recognition system 104 may determine the label for an unlabeled face track using the face models. This process will be described in more detail below.

Once some face tracks have been identified with labels, at 310, a confirmation process occurs and face recognition system 104 may adjust the face models for another iteration of determining labels for face track that are either unlabeled or have labels there were not confirmed. The above process will now be described in more detail.

Figure 4:
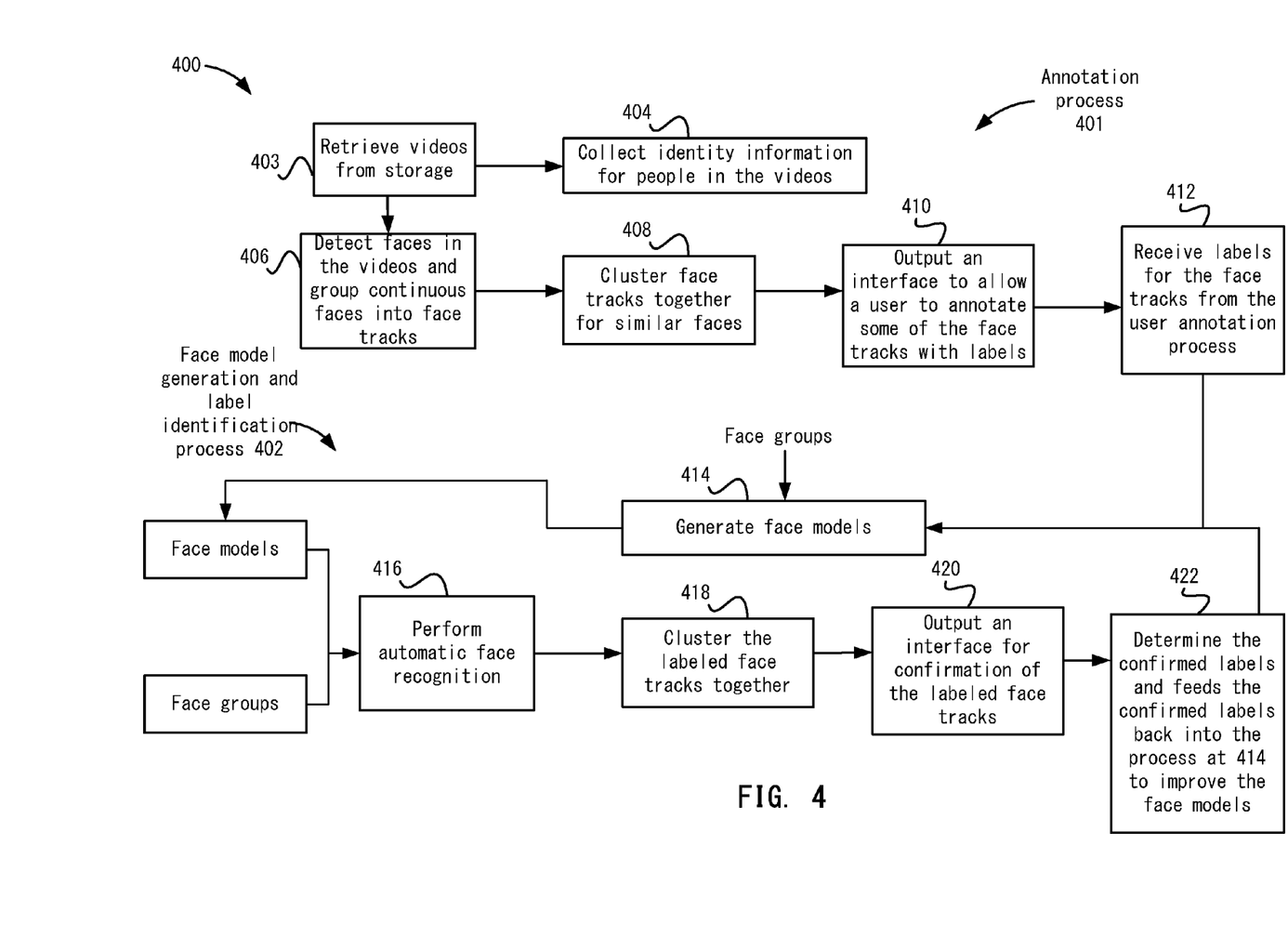
FIG. 4 depicts a simplified flowchart of the overall process described in FIG. 3 according to one embodiment.

FIG. 4 depicts a simplified flowchart 400 of the overall process described in FIG. 3 according to one embodiment. The process shown includes an annotation process 401 and a face model generation and label identification process 402. In the annotation process 401, at 403, face recognition system 104 retrieves videos 106 from storage 108. The videos may be television episodes, movies, or other video content. At 404, face recognition system 104 may collect identity information for people in the videos. For example, various actor information may be available on the Internet. Face recognition system 104 may leverage metadata for the video to collect the information for actors. This information may be later used to add interactive content for the labeled face tracks.

At 406, face recognition system 104 may detect faces in the videos and group continuous faces into face tracks. In one example, face recognition system 104 may work in groups of videos that are related, such as a series of a show (e.g., one season of the show). For each video, face recognition system 104 may detect faces over intervals of frames, such as every five frames. Then, face recognition system 104 runs a face tracker that tracks faces through the detected faces in the frames. That is, faces are tracked through every frame using the faces detected every five frames. This groups time-continuous faces into face tracks.

At 408, face recognition system 104 may cluster face tracks together for similar faces. For example, the face tracks that may include similar faces may be clustered together for one annotation. The grouped face tracks may be from different videos, but in the same season.

At 410, face recognition system 104 outputs an interface to allow a user to annotate some of the face tracks with labels. For example, in a bootstrap stage, face recognition system 104 requires a certain number of labels for the face tracks to build accurate face models. In one embodiment, 20% of the face tracks may be annotated by a user, but other amounts may be possible. The selected face tracks may be as diverse as possible to cover as many poses as possible and as many faces.

At 412, face recognition system 104 receives labels for the face tracks from the user annotation process. For examples, the labels may indicate the identities of a person depicted in a group of face tracks.

Once receiving the initial labels, in the section 402, face recognition system 104 automatically determines labels for face tracks that do not have labels. This may use a label for a person #1 from the user annotation process, and determine face tracks for the same person #1 in other face tracks. In the annotation process, at 414, face recognition system 104 generates face models. In this example, in a first iteration, which is when face models have not been generated before for the people in the video, such as in iteration #1, face recognition system 104 receives the labels provided by users at 412. As will be described in more detail below, face recognition system 104 generates the face models by building nearest-neighbor-based face models for each person in the face tracks. For example, face recognition system 104 extracts multiple features for each face in the face tracks that have been labeled and stores the features with the labels. That is, for a single label, features from the face tracks are extracted and used to build the face model for that label.

Then, face recognition system 104 automatically recognizes the rest of the unlabeled face tracks. At 416, using the generated face models and the face tracks, face recognition system 104 performs automatic face recognition using a face recognizer process. The face recognizer receives the face models and unlabeled face tracks, and determines a labeled face track that is most similar to an unlabeled face track. Face recognition system 104 then classifies the unlabeled face track with a label of a similar face track based on the recognition process. For example, the method determines sampled features for the unlabeled face tracks, such as local binary pattern (LBP) features, color histogram features, and texture features. Then, the method determines local neighbors for the faces in the face track with respect to the multiple feature spaces from the known features from the labeled face tracks. That is, the known features are from the features of the face models that were built. This similarity analysis is performed to determine coefficients to represent the similarity between the sample features and the known features for the labeled face tracks. The coefficients describe how much the unknown face is composed from features from its labeled neighbor faces with respect to the feature space. For example, face recognition system 104 uses a sparse linear combination solver that minimizes the feature differences between the sample face and its neighbors. The method determines a solution that best combines the similarity information between the sample face track and its local neighbors. This generates coefficients for the labeled face track features. Then, face recognition system 104 generates a voting distribution of the labeled face track features using the coefficients and a weighting function that weights the labeled features based on a confidence level of the features. The confidence level may quantify how accurate a label for the feature may be. The weighting uses a weight matrix that uses a non-linear component and a linear component to determine learned weights. Once the weights are learned, face recognition system 104 can determine the label for the sample features by combining the weighted known features for each label to determine the label that has known features most similar to the sample features.

After determining labels for some of the unlabeled face tracks, at 418, face recognition system 104 clusters the labeled face tracks together. Clustering the labeled face tracks together may allow a user to confirm a group of face tracks that may be labeled with the same identity with a single confirmation. This is because groups of visually-similar faces may take less time for confirmation. Thus, at 420, face recognition system 104 outputs an interface for confirmation of the labeled face tracks. Users can review the labels for the face tracks and confirm or not confirm them. Then, face recognition system 104 receives confirmation of the face tracks. In one embodiment, face recognition system 104 only requires users to confirm face tracks that were labeled with high confidence. This may reduce the time a user needs to confirm the face tracks as only highly accurate face tracks may be confirmed, which may be easier for a user to confirm. Other iterations of the process may be performed and used to recognize face tracks that were labeled with lower confidence. That is, at 422, face recognition system 104 determines the confirmed labels and feeds the confirmed labels back into the process at 414 to improve the face models. By re-learning optimal fusion weights with more face track labels, the face models will become more accurate because of more sufficient example faces. The features from the confirmed labeled face tracks can then be used to generate or adjust the face models. The process then is performed again to automatically label face tracks that were not previously confirmed.

Figure 5:
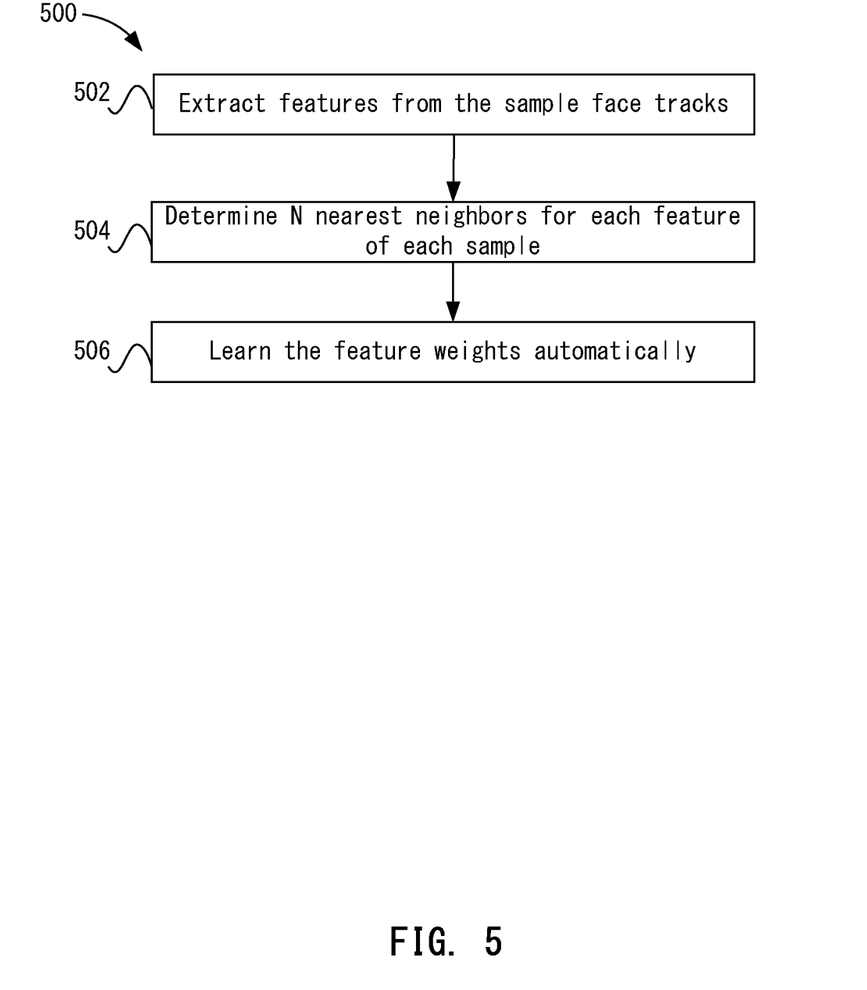
FIG. 5 depicts a more detailed example of generating face models and recognizing faces according to one embodiment.

The process of generating face models is important to accurately label the face tracks. FIG. 5 depicts a more detailed example of generating face models and determining labels according to one embodiment. At 502, face recognition system 104 extracts features from the sample face tracks (e.g., the unlabeled face tracks). In one embodiment, multi-sample, multi-view features are extracted. This means that from multiple samples and multi-views of features are extracted from possibly multiple videos.

A face model may be used by the face recognizer to recognize faces. Various methods can annotate different feature vectors and fuse all samples linearly as a feature vector. The vectors and known labels are fed into a model generator to learn optimal multi-class models. This learns an optimal weight vector with respect to an identity and the features of the face. However, as the number of samples grows, many parameters need to be learned, and this method may not work efficiently.

Different from methods that learn complex feature boundaries between entities, a local linear embedding (LLE) method can generalize well as the amount of labeled examples increases without updating any parameters. Fusing LLE recognizers learned in different features can combine discriminative powers of different features. However, different feature spaces have different unknown correlations with different identities. Accordingly, particular embodiments provide an algorithm that learns the correlation factors (e.g., fusion weights) of different feature spaces. As will be described below, the weights are learned based on a matrix that weights features non-linearly.

Face recognition system 104 extracts different kinds of features for every face sample in a face track X. As described above, the features may be LBP features, pose features, etc. These features may be denoted as $X_{ij}$.

At 504, face recognition system 104 determines N nearest neighbors for each feature of each sample. For example, a K-nearest-neighbor algorithm may be used to search for the nearest neighbors from the features of the labeled face tracks.

For jth feature of ith face in X, denoted as $X_{ij}$, the K-Nearest-Neighbor algorithm finds its nearest known samples from the features of the face models, denoted as $N_{ij}=\{S_1, \ldots, S_n\}$ where $S_1$ is the most similar neighbor and $S_2$ is the second one. Then, at 506, face recognition system 104 performs linear decomposition for each sample and each feature of the face models. For example, a sparse linear combination solver minimizes the difference between $X_{ij}$ and the linear combination among $N_{ij}$:

$$b_{ij} = \operatorname*{argmin}_{\alpha} \lambda |\alpha| + \left\| X_{ij} - \sum_k \alpha_k S_k \right\|.$$

This determines the coefficients $b_{ij}$, and with the coefficients $b_{ij}$, face recognition system 104 can generate a voting distribution over the identity list $a_{ij}$:

$$a_{ij}(l) = \sum_{label\ of\ S_k = l} b_{ij}(k)$$

To measure the reliability of the voting, face recognition system 104 uses the sparse concentration index $c_{ij}$ as confidence scores:

$$c_{ij} = \left( \frac{n\ \max a_{ij}}{1^T a_{ij}} - 1 \right) \Big/ n$$

In order to fuse $a_{i1}$, $a_{i2}$ . . . to label sample $X_{ij}$, face recognition system 104 uses the formula $a_i = \Sigma_j w_j\ (c_{ij}) a_{ij}$. Face recognition system 104 define weighting function $w_j(c) = v_{j1} c^2 + v_{j2} c$, where $c^2$ is the non-linear part that magnifies votes with large confidence scores and $v_j$, are fixed parameters need to learn. This introduces a non-linear fusion that magnifies high confidence features and suppresses low confidence features. Particular embodiments learn the unknown weight parameters automatically.

The sparse concentration index may measure the confidence of the labeling using:

$$SCI(x) = \frac{k \frac{\max_i \|x(i)\|_1}{\|x\|_1} - 1}{k - 1},$$

where k is the number of vector components. From the definition of SCI, face recognition system 104 finds that the larger the biggest component is, the higher the SCI score is. This means most of the energy concentrates on the biggest component, i.e., the coefficient vector is sparse. This index quantifies the confidence of a label for a face track that was automatically annotated. For example, face tracks with clearer features are labeled with a higher confidence than face tracks with blurrier features.

In the above step at 506, face recognition system 104 learns the feature weights automatically. Face recognition system 104 uses a learning method to find an optimal mapping function that maps the feature vectors on unlabeled face track X to a label associated with a face model. The mapping function maps a face track X into feature spaces for face models that represent the non-linear magnification part and linear part of the voting scores for each feature $X_{ij}$. The mapping function uses a matrix that may be a stack of vectors. The vectors may include a non-linear magnification part and a linear part.

During the training, face recognition system 104 selects some samples for an identity Y. The machine learning algorithm, such as a structured output support vector machine (SO-SVM), may generate a feature vector containing the non-linear magnification part and the linear part to update the optimal fusing weights. The fusing weights indicate for a feature space F that is distinctive for an identity A, then the weight would be high. That is, if an unlabeled face track had features similar to feature space F, then the probability is high that this unlabeled face track has the identity of A. Eventually, the training process will result in weight vectors that best combine multi-view features for face track recognition. The weight vectors may be used to correlate features from known identities to features in face track X in which the identity is not known. With the learned fusion weights, face recognition system 104 can vote an identity label for an unlabeled track X. For example, using a formula that corresponds to the non-linear fusions of multi-view features, an identity label may be associated with a face track X.

With unknown parameters w (e.g., fusion weights) in the recognizer, face recognition system 104 needs a learning method to find an optimal mapping function $f_w: \Phi(X) \to y$ that maximizes the classification accuracy. The mapping function $\Phi(X)$ maps X into feature spaces $\Phi$: $X \to \{X_{ij}\} \to \{c_{ij}^2(\bullet), c_{ij}(\bullet)\}$, which represents a magnification (non-linear) part and linear part of voting scores for each feature $X_{ij}$.

The problem has a structured input space that uses a joint kernel to learn the fusion weights. By introducing a joint kernel, the parameters w could be learned using structured output SVM (SO-SVM). The primal formulation is given as follows:

$$\min_{w,\xi} \|w\|^2 + C\Sigma \xi_n$$
$$\text{s.t. } w'(\Psi(x_n, y_n) - \Psi(x_n, y)) \geq \Delta(y_n, y) - \xi_n, \quad \forall y \in \gamma$$

The voting weight w is the stack of vectors $v_j$. To learn w, face recognition system 104 defines $\Psi(x,y) = \Phi(x)\Lambda(y)$, where $\Lambda(y) = [0 \ldots 1 \ldots 0]'$ is a vector with only y-th row 1, which selects features for class y. And the weighting matrix function $\Phi(x)$ maps a track to a matrix with confidences for different identities:

$$\Phi(x) = \begin{bmatrix} \ldots & \Sigma_i c_{i1}^2(y) & \ldots \\ \ldots & \Sigma_i c_{i1}(y) & \ldots \\ \vdots & \ddots & \vdots \\ \ldots & \Sigma_i c_{if}^2(y) & \ldots \\ \ldots & \Sigma_i c_{if}(y) & \ldots \end{bmatrix}$$

During each machine learning algorithm training step, face recognition system 104 selects some samples for each identity y. Correspondingly, the joint-kernel function $\Psi(x, y)$ generates a feature vector containing $\{c_{ij}^2(\bullet), c_{ij}(\bullet)\}$ to update the optimal fusing weights. Eventually, it will result in weight vectors that best combine multi-view features for face track recognition. With learned fusion weights, face recognition system 104 can vote the identity label for an unlabeled track X, using following formula:

$$y = \text{argmax}_y w'\Psi(x,y)$$

It can be verified that:

$$w'\Phi(x)\Lambda(y) = (w_{11}\Sigma_i c_{i1}^2(y) + w_{12}\Sigma_i c_{i1}(y)) + \ldots$$
$$+ (w_{f1}\Sigma_i c_{if}^2(y) + w_{f2}\Sigma_i c_{if}(y))$$

This corresponds to non-linear fusions of multi-view features. A large $w_{f1}$ indicates that the corresponding feature has high correlation with the identity y. The function value corresponding to optimal y is the confidence score for track X, indicating the confidence level of assigning label y to track X. A label that has higher confidence features that are neighbors with the sample features of the face track without a label is voted as the label for the face track.

As can be seen in the non-linear fusion, the non-linear magnification part of a vector is multiplied, such as by an exponent "2" in the term:

$$\Sigma_i c_{i1}^2(y).$$

Also, the linear part of the feature vector is not squared:

$$\Sigma_i c_{i1}(y).$$

This magnifies the features in which the confidence is high for a feature and also suppresses the features that have low confidence. This is because higher confidence scores are magnified more using the non-linear portion than lower confidence scores. Suppose there are two cases: a first label has four face features each with a 0.25 confidence score and a second label has four face features with confidence score 0.2, 0.2, 0.2 and 0.4. Without a magnification portion (e.g., a square fusion portion), both label's fusion score are the same. However, in reality, four 0.25 confidence scores for the first label often come from very similar low quality face images. Moreover, for the second label case, the face with score 0.4 most likely comes from high quality face image. Thus, introducing non-linear portion would differentiate two labels and utilize high confidence face features. This may be important when using multiple features from multiple face samples. When sufficient face tracks from one or many videos are labeled, there would be many known face samples with different qualities. Using particular embodiments, low-quality recognition results are suppressed due to the non-linear portion. Thus, the method can generalize well with many faces in different poses and expressions, compared with other methods. When performing face recognition in a large library of videos where there may be a series of similar videos with similar characters. The use of the non-linear weighting function improves the performance of face recognition. In the series of videos, there may be many low quality images of a person with some higher quality images. The higher quality images may be magnified, and produce better recognition results when used over multiple videos.

To fuse labels $\{a_i\}$ for different samples $X_i$, a simple way is to add up all identity distributions $\{a_i\}$. However, there are mismatches that many samples are very similar and they all match to faces with wrong identities. In order to avoid these mismatches, particular embodiments adopt a diversity-sampling algorithm to select diverse samples. We define the similarity function for:

$$\text{sim}(X_k, X_l) = (\text{sim}(X_k, X_l) + \text{sim}(X_k, S_{l1}) + \text{sim}(S_{k1}, X_l) + \text{sim}(S_{k1}, S_{l1}))/4$$

Where $S_{k1}, S_{l1}$ are the most similar neighbor of $X_k, X_l$.
Finally, the label of the face track X is determined using the formula:

$$I_X = \text{argmax}_l \sum_{X_i \in \text{div}(\{X_k\})} a_i(l)$$

In summary, a user may have labeled face tracks for actors #1, #2, and #3. Face recognition system 104 builds face models for actors #1, #2, and #3. Then, for each unlabeled face track X, face recognition system 104 determines features for a face track X and compares the features to known features in the labeled face tracks. A weighting function for the known features in the face models is used to determine which known features are closest to the features for face track X. Face recognition system 104 determines a voting value for each label based on the values for the known features that were mapped to the sampled features for face track X using the weighting function.

A confirmation page helps users select the correct recognition results. In one embodiment, for each identified label, a face image may be provided and also the number of tracks assigned to that label. A user can simply confirm the label as an error or as correct. The similar face tracks may be grouped to reduce the amount of confirmation needed for the user. The results of the confirmation are then fed back for adjusting the face models.

Face recognition system 104 generates a confidence score for each label. Generally, the confidence score is lower for low-quality face tracks or the face tracks that are unknown. The confirmation page automatically ranks the more confident face tracks in the first pages.

With the new confirmed face images, the face models become more accurate. The unconfident face tracks could be correctly recognized with better face models.

SYSTEM OVERVIEW

Figure 6:
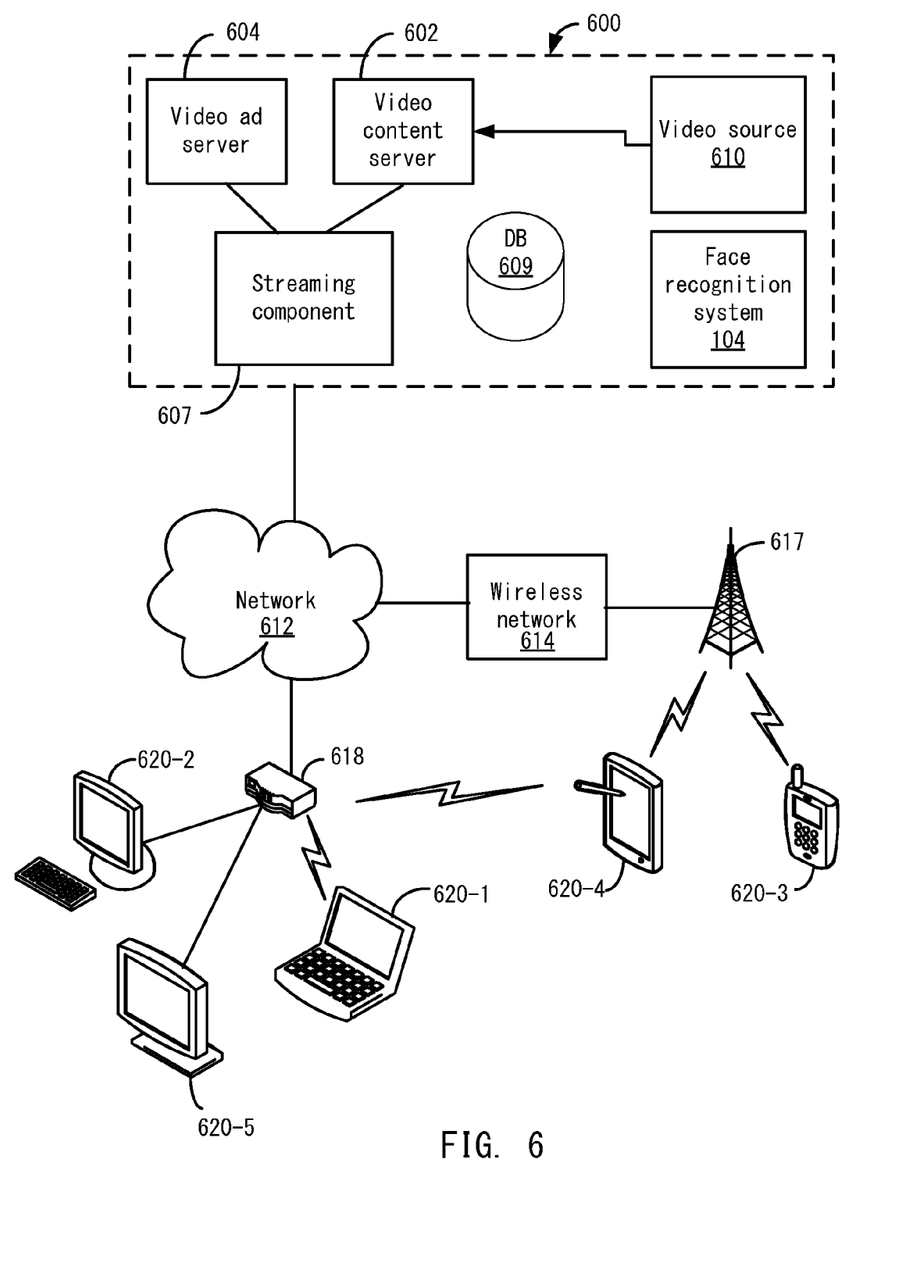
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include face recognition system 104.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612 and/or other network 614. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless telephony network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file.

Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
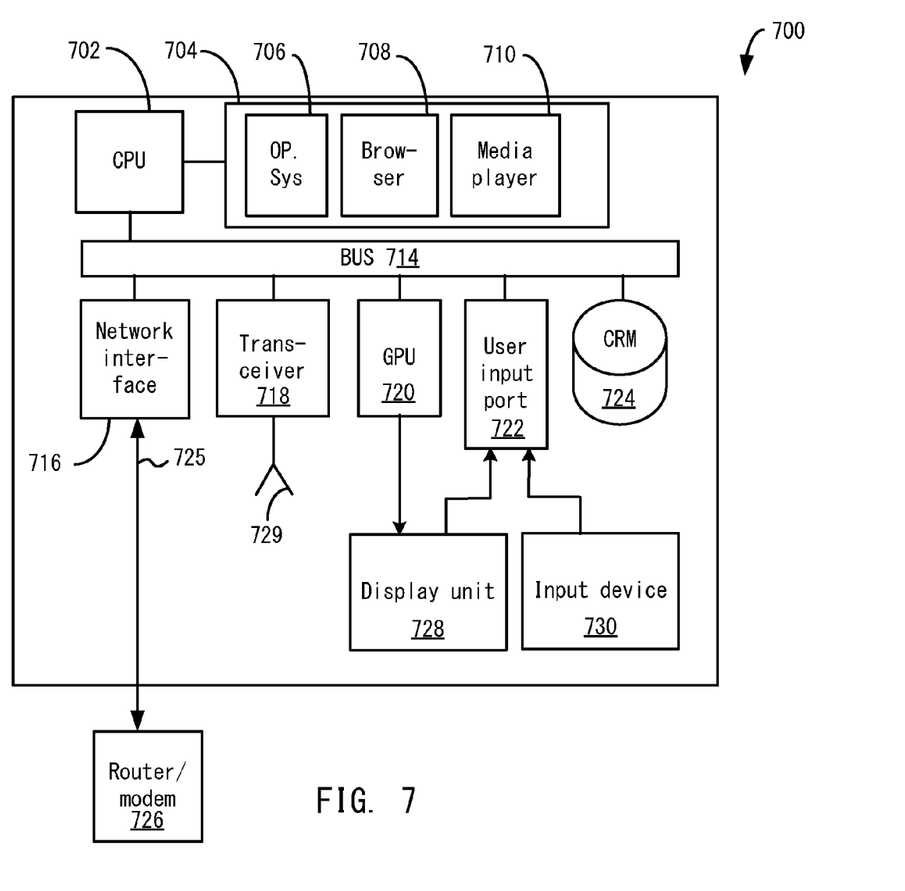
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include modules that display interactive content added to faces detected in the video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a plurality of face tracks for detected face samples in a video;
   receiving, by the computing device, a set of labels for a portion of the plurality of face tracks from a set of users to form a set of labeled face tracks, wherein a label in the set of labels identifies an identity for a face track in the set of labeled face tracks;
   extracting, by the computing device, a first set of features for a first plurality of face samples in an unlabeled face track in the plurality of face tracks, wherein an identity for the unlabeled face track is not known;
   correlating, by the computing device, the extracted first set of features for the unlabeled face track to a second set of features from a second plurality of face samples in the set of labeled face tracks;
   generating, by the computing device, feature weights for the first set of features based on a set of confidence scores for the second set of features using a weighting function that magnifies feature weights for second features from the second plurality of face samples in the second set of features with higher confidence scores more than feature weights for second features from the second plurality of face samples in the second set of features with lower confidence scores in a non-linear manner, wherein a confidence score in the set of confidence scores for a feature in the second plurality of features is based on a quality of a face track in the set of labeled face tracks that includes the feature in the second plurality of features; and
   using, by the computing device, the generated feature weights to determine a label for the unlabeled face track by applying the generated feature weights to the second set of features.

2. The method of claim 1, wherein generating the feature weights comprises:
   selecting the second set of features for the set of labeled face tracks;
   generating a feature vector for each feature in the second set of features based on the correlating; and
   generating feature weights based on the feature vector for each feature in the second set of features.

3. The method of claim 2, wherein the feature vector comprises a non-linear portion and a linear portion.

4. The method of claim 1, wherein using the generated feature weights to generate the label comprises:
   combining the feature weights for the first set of features to generate combined fusion scores for each face track in the portion of the plurality of face tracks; and
   determining the label based on the combined fusion scores for each face track.

5. The method of claim 4, wherein a combined fusion score is generated non-linearly.

6. The method of claim 5, wherein the combined fusion score magnifies feature weights with higher confidence scores and suppresses feature weights with lower confidence scores in a non-linear manner for each of the second set of features for a face track with a label.

7. The method of claim 4, wherein the label with a highest combined fusion score is used as the label for the unlabeled face track.

8. The method of claim 1, further comprising:
   extracting the second set of features from the set of labeled face tracks; and
   generating face models using the second set of features, the face models used to correlate the second set of features from the set of labeled face tracks to the first set of features for the unlabeled face track.

9. The method of claim 1, wherein correlating comprises:
   determining the feature weights for the second set of features based on a similarity of the second set of features to the first set of features.

10. The method of claim 9, wherein correlating comprises:
    determining the second set of features that are nearest neighbors to the first set of features.

11. The method of claim 10, wherein each label for the set of labeled face tracks includes a respective second set of features that are nearest neighbors to the first set of features.

12. The method of claim 1, wherein the weighting function comprises:
    $w_j(c) = v_{j1}c^2 + v_{j2}c$, where $c^2$ is a non-linear part that magnifies confidence scores, c is a linear part for confidence scores, and $v_j$ are fixed parameters.

13. A non-transitory computer-readable storage medium containing instructions, that when executed, control a computer system to be configured for:
    determining a plurality of face tracks for detected face samples in a video;
    receiving a set of labels for a portion of the plurality of face tracks from a set of users to form a set of labeled face tracks, wherein a label in the set of labels identifies an identity for a face track in the set of labeled face tracks;

extracting a first set of features for a first plurality of face samples in an unlabeled face track in the plurality of face tracks, wherein an identity for the unlabeled face track is not known;

correlating the extracted first set of features for the unlabeled face track to a second set of features from a second plurality of face samples in the set of labeled face tracks;

generating feature weights for the first set of features based on a set of confidence scores for the second set of features using a weighting function that magnifies feature weights for second features from the second plurality of face samples in the second set of features with higher confidence scores more than feature weights for second features from the second plurality of face samples in the second set of features with lower confidence scores in a non-linear manner, wherein a confidence score in the set of confidence scores for a feature in the second plurality of features is based on a quality of a face track in the set of labeled face tracks that includes the feature in the second plurality of features; and using the generated feature weights to determine a label for the unlabeled face track by applying the generated feature weights to the second set of features.

14. The non-transitory computer-readable storage medium of claim 13, wherein generating the feature weights comprises:

selecting the second set of features for the set of labeled face tracks;

generating a feature vector for each feature in the second set of features based on the correlating; and generating feature weights based on the feature vector for each feature in the second set of features.

15. The non-transitory computer-readable storage medium of claim 14, wherein the feature vector comprises a non-linear portion and a linear portion.

16. The non-transitory computer-readable storage medium of claim 13, wherein using the generated feature weights to generate the label comprises:

combining the feature weights for the first set of features to generate combined fusion scores for each face track in the portion of the plurality of face tracks; and determining the label based on the combined fusion scores for each face track.

17. The non-transitory computer-readable storage medium of claim 16, wherein the combined fusion score magnifies feature weights with higher confidence scores and suppresses feature weights with lower confidence scores in a non-linear manner for each of the second set of features for a face track with a label.

18. The non-transitory computer-readable storage medium of claim 13, further configured for:

extracting the second set of features from the set of labeled face tracks; and generating face models using the second set of features, the face models used to correlate the second set of features from the set of labeled face tracks to the first set of features for the unlabeled face track.

19. The non-transitory computer-readable storage medium of claim 13, wherein correlating comprises:

determining the feature weights for the second set of features based on a similarity of the second set of features to the first set of features.

20. An apparatus comprising:

one or more computer processors; and a non-transitory computer-readable storage medium comprising instructions, that when executed, control the one or more computer processors to be configured for:

determining a plurality of face tracks for detected face samples in a video;

receiving a set of labels for a portion of the plurality of face tracks from a set of users to form a set of labeled face tracks, wherein a label in the set of labels identifies an identity for a face track in the set of labeled face tracks;

extracting a first set of features for a first plurality of face samples in an unlabeled face track in the plurality of face tracks, wherein an identity for the unlabeled face track is not known;

correlating the extracted first set of features for the unlabeled face track to a second set of features from a second plurality of face samples in the set of labeled face tracks;

generating feature weights for the first set of features based on a set of confidence scores for the second set of features using a weighting function that magnifies feature weights for second features from the second plurality of face samples in the second set of features with higher confidence scores more than feature weights for second features from the second plurality of face samples in the second set of features with lower confidence scores in a non-linear manner, wherein a confidence score in the set of confidence scores for a feature in the second plurality of features is based on a quality of a face track in the set of labeled face tracks that includes the feature in the second plurality of features; and using the generated feature weights to determine a label for the unlabeled face track by applying the generated feature weights to the second set of features.

* * * * *